United States Patent

Nabuurs

[11] Patent Number: 5,553,913
[45] Date of Patent: Sep. 10, 1996

[54] MOTOR VEHICLE SLIDING ROOF PANEL SEAL

[75] Inventor: Martinus W. M. Nabuurs, Overloon, Netherlands

[73] Assignee: Inalfa B.V., Netherlands

[21] Appl. No.: 370,280

[22] Filed: Jan. 9, 1995

[30] Foreign Application Priority Data

Jan. 10, 1994 [NL] Netherlands ............................ 9400035

[51] Int. Cl.[6] .................................................. B60J 10/12
[52] U.S. Cl. ........................ 296/216; 49/480.1; 49/484.1; 49/490.1; 49/495.1
[58] Field of Search ............... 296/216, 146.15–146.16; 52/204.591; 49/480.1, 484.1, 490.1, 495.1

[56] References Cited

U.S. PATENT DOCUMENTS

| 4,614,061 | 9/1986 | Brocke | 49/490.1 X |
| 5,170,587 | 12/1992 | Nakatani et al. | 296/216 X |

FOREIGN PATENT DOCUMENTS

| 3604298C1 | 6/1987 | Germany. | |
| 93 07 831.5 | 8/1993 | Germany. | |
| 109427 | 6/1984 | Japan | 296/216 |
| 128022 | 7/1985 | Japan | 296/216 |
| 18520 | 1/1986 | Japan | 296/216 |
| 4078617 | 3/1992 | Japan | 296/216 |
| 2199067 | 6/1988 | United Kingdom. | |

*Primary Examiner*—Dennis H. Pedder
*Attorney, Agent, or Firm*—Skjerven, Morrill, MacPherson, Franklin & Friel; Thomas S. MacDonald; Alan H. MacPherson

[57] ABSTRACT

The invention relates to a roof panel intended for closing an opening provided in a roof of a motor vehicle. The roof panel is at least along part of its circumference provided with a sealing section made of a resilient material, which is mounted on a supporting flange of the roof panel. Near its upper end the sealing section is provided with a sealing flange, which is at least substantially in line with the closing plate, the sealing flange joining an upper end of a leg of a substantially U-shaped connecting part near its end located near the closing plate. The other leg, which is located at a larger distance from the closing plate, is connected with the supporting flange, whilst a resilient lip engaging under the closing plate is connected to the leg joining the sealing flange of the sealing section.

9 Claims, 1 Drawing Sheet

MOTOR VEHICLE SLIDING ROOF PANEL SEAL

BACKGROUND OF THE INVENTION

1. Field of the Invention

The invention relates to a roof panel intended for closing an opening provided in a roof of a motor vehicle, whereby said panel comprises a substantially flat transparent closing plate, which is at least along part of its circumference provided with a sealing section made of a resilient material, which is mounted on a supporting flange of the roof panel.

2. Related Art

Roof panels of the above kind are known, whereby the sealing section provided around an edge of the roof panel extends some distance above the upper surface of the transparent closing plate. A construction of this type has several drawbacks. Thus the parts projecting above the closing plate increase the amount of drag, as well as the total height required for the roof. In addition to that water may remain behind on the roof panel.

Furthermore roof panels have been proposed which comprise sealing sections whose upper boundary surface lies at least substantially in one plane with the upper boundary surface of the closing plate. Profiles of this type must be integrally cast with the closing plate, however, using special moulds, which renders their production time-consuming and costly. Furthermore it is not easy to replace a sealing section in case it is damaged.

SUMMARY OF THE INVENTION

The object of the invention is to obtain a roof panel of the above kind, wherein the drawbacks of the known roof panels can be avoided.

According to the invention this may be achieved in that said sealing section is near its upper end provided with a sealing flange being at least substantially in line with said closing plate, said sealing flange near its end located near the closing plate joining an upper end of a leg of a substantially U-shaped connecting part, the other leg of said connecting part, which is located at a larger distance from the closing plate, being connected with the supporting flange, whilst a resilient lip engaging under the closing plate is connected to the leg joining the sealing flange of the sealing section.

By using the construction according to the invention a roof panel may be obtained whereby the sealing section, which has been made beforehand, can be secured to a supporting flange forming part of the roof panel in a quick and simple manner, and whereby allowance is made for large manufacturing tolerances in the dimensions of the closing plate, without this harming the intended sealing of the sealing section.

BRIEF DESCRIPTION OF THE DRAWING

The invention will be explained in more detail hereafter with reference to the accompanying Figures.

DETAILED DESCRIPTION

Figure 1:
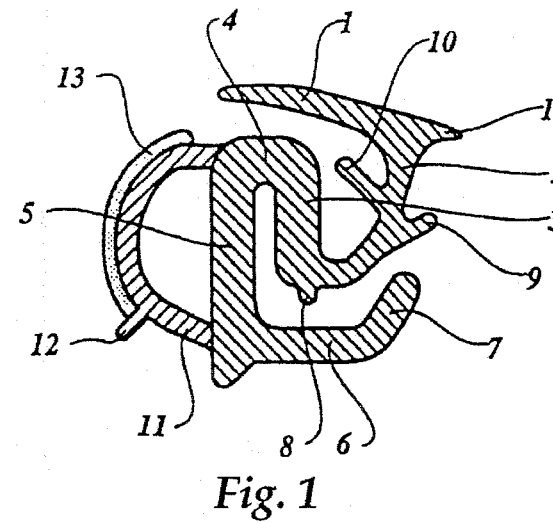
FIG. 1 is a cross-sectional view of a sealing section according to the invention, in unloaded condition.

FIG. 1 shows a sealing section according to the invention in unloaded condition.

The sealing section is provided with a sealing flange 1, which is joined near one end by the upper end of a leg 2 of a substantially U-shaped connecting part, whose other leg 3 joins the leg 2 near the end of leg 2 remote from the sealing flange 1.

The end of the leg 3 directed towards the sealing flange 1 is connected, via a connecting piece 4, to a strip-shaped part 5 of the sealing section extending parallel to the leg 3.

A leg 6 extending perpendicularly to the strip-shaped part 5 joins the bottom end of the strip-shaped part 5 remote from the connecting piece 4, the free end 7 of said leg 6 curving upwards in the direction of the U-shaped leg 2, 3.

A rib 8 extending downwards in the direction of leg 6 joins the bottom end of leg 3.

A lip 9 joins the side of leg 2 remote from leg 3, said lip 9 extending upwards from the joining point to leg 2, in a direction remote from the leg 3.

A further lip 10 joins the side of the leg 2 directed towards the leg 3 slightly above the joining point of lip 9, said further lip 10 sloping upwards from its joining point to leg 2, in the direction of leg 3.

A buffer part 11 having a curved section is with its upper end connected to the upper end of the strip-shaped part 5, at the side of the strip-shaped part remote from the U-shaped part 2, 3, and with its bottom end to the strip-shaped part 5 near the bottom end of the strip-shaped part 5.

Some distance from its bottom end the buffer-shaped part 11 is provided with an outwardly projecting lip 12. The part of the buffer part 11 located above the lip, seen in FIG. 1, is covered with a layer of a velours material 13 over the larger part of its surface area.

The part of the sealing section consisting of parts 1–10 is made of rubber, preferably rubber having a hardness of ±90° Shore.

The buffer part 11 is usually made of foam rubber or a similar resilient material.

The sealing section 1 may be provided along at least one edge of a transparent closing plate 14 forming part of a roof panel. For this purpose the sealing section is secured to a flange 15 likewise forming part of the roof panel, which extends parallel to the respective edge of closing plate 14 and which may form part of a frame 16 of the roof panel supporting the closing plate 14. As will be apparent from FIG. 2, said sealing section is thereby mounted in such a manner that said flange 15 is received with a slightly clamped fit between the strip-shaped part 5 and leg 3 of the U-shaped part of the sealing section.

Figure 2:
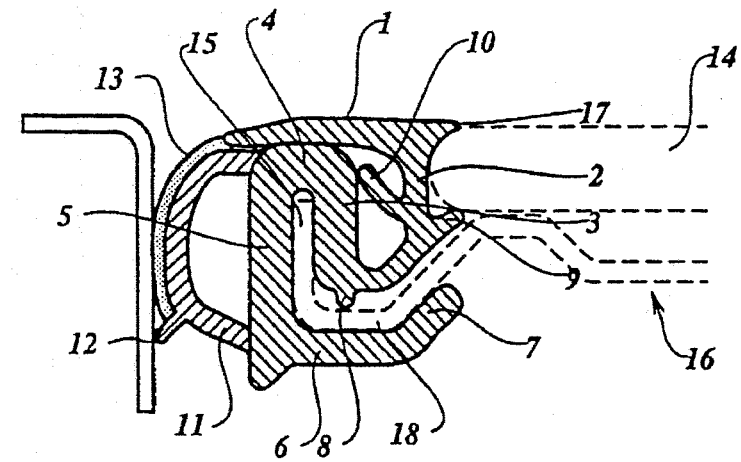
FIG. 2 is a sectional view of a sealing section according to FIG. 1, mounted on a diagrammatically indicated roof panel.

A nose 17 of the sealing flange projecting beyond leg 2 thereby abuts against one end of closing plate 14, whilst leg 2 is slightly pressed towards leg 3 of the U-shaped part of the sealing section by closing plate 14, as will be apparent from FIG. 2. The upper surface of sealing flange 1 lies substantially in one plane with the upper surface of closing plate 14 thereby, whilst the free end of sealing flange 1 abuts against the buffer-shaped part 11.

When the sealing section is mounted in this manner, rib 8 projecting at the bottom side of leg 3 abuts against a plate part 18 of frame 16 joining flange 15. Furthermore the resilient projecting lip 9 engages under the plate 14, thereby drawing the nose 17 against the plate 14. The resilient lip 10 is slightly deformed between the sides of legs 2 and 3 facing each other, thereby exerting a pushing force in the direction of plate 14, just above the connecting point of lip 9 to leg 2. Under the influence of this force the sealing flange 1 tends to pivot in anti-clockwise direction about an imaginary pivot axis extending perpendicularly to the plane of the drawing, seen in FIG. 2, so that a satisfactory pressure of the free end of the sealing flange 1 against the buffer part 11 is obtained.

It will be apparent that the sealing section shown in FIG. 1 can be secured to flange 15 in a simple manner, said flange 15 forming part of the frame 16 of the roof panel supporting the closing plate 14, which generally consists of a transparent material, for example glass or plastic material. The parts 6 and 7 of the sealing section forming an anchoring part furthermore engage around parts of the frame 16 thereby.

A further advantage of the construction according to the invention is that the sealing section can be readily adjusted to comparatively large dimensional tolerances which occur in the production of transparent closing plates of this type.

Figure 3:
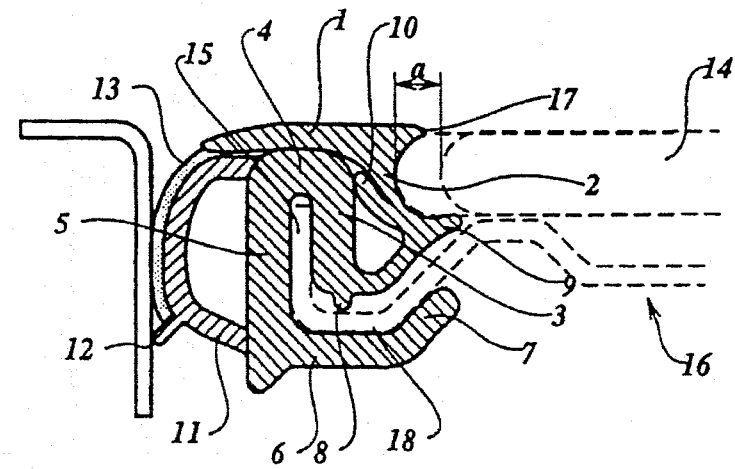
FIG. 3 is a sectional view corresponding with FIG. 2, wherein the closing plate forming part of the roof panel is larger than the closing plate shown in FIG. 2.

Thus FIG. 3 shows the sealing section in conjunction with a closing plate 14', which, seen in the direction perpendicularly to the longitudinal direction of the sealing section, is a dimension a larger than the sealing section shown in FIG. 2. From the Figures it will be apparent that as a result of this especially the two resilient lips 9 and 10 are deformed slightly more, as a result of which the sealing section will be pressed together even better.

I claim:

1. A roof panel for closing an opening provided in a roof of a motor vehicle comprising:
   a substantially flat closing plate (14);
   a resilient sealing section extending along at least part of a circumference of said closing plate;
   a supporting flange (15), said sealing section being secured to the supporting flange; and
   wherein said sealing section comprises a sealing flange (1) substantially in a plane with an upper boundary surface of said closing plate, said sealing flange having a first end adjacent to an end of said closing plate;
   a substantially U-shaped connecting part (2, 3) including a first leg (2) connected to said sealing flange (1) and a second leg (3), said legs forming an opening facing toward said sealing flange (1), said second leg (3) being located at a larger distance from said closing plate than the first leg (2), the second leg (3) having a surface remote from the first leg connected to the supporting flange (15); and
   a resilient lip (9) connected to the first leg (2) and engageable with an underside of said closing plate in a closed position of said closing plate and wherein when the first leg is pressed toward the second leg by said closing plate said sealing flange (1) abuts against said closing plate (14).

2. A roof panel according to claim 1, wherein said first leg (2) on a side directed towards the second leg (3) includes a lip (10) sloping upwards in the direction of said sealing flange, said lip (10) joining the first leg (2) at a point located nearer the sealing flange (1) than does the resilient lip (9) located at the other side of said first leg (2).

3. A roof panel according to claim 1, wherein said sealing section further includes a strip-shaped part (5) extending parallel to the second leg (3) and connected at a connecting part to an end of said second leg (3) and directed towards the sealing flange (1), and wherein said supporting flange (15) is retained between the second leg (3) and said strip-shaped part (5).

4. A roof panel according to claim 3, further including an anchoring part (6, 7) joined to an end of said strip-shaped part (5) remote from the connecting part, said anchoring part engaging around a part of the supporting flange.

5. A roof panel according to claim 1, said sealing section further including a projecting resilient rib (8) connected to an end of said second leg (3) remote from said sealing flange (1), said rib (8) abutting against the supporting flange of the roof panel.

6. A roof panel according to claim 3, further including a buffer part (11) having a curved section connected to a side of said strip-shaped part (5) remote from said connecting part (2, 3).

7. A roof panel according to claim 2, wherein said sealing section includes a strip shaped part (5) extending parallel to the second leg (3) and located further away from the closing plate than the second leg and wherein said supporting flange (15) is retained between the second leg (3) and said strip-shaped part (5).

8. A sealing section for a closing plate used to close a vehicle roof opening, said sealing section comprising:
   a substantially flat closing plate (14);
   a resilient sealing section extending along at least part of a circumference of said plate;
   a supporting flange (15), said sealing section being secured to the supporting flange; and
   wherein the sealing section comprises a sealing flange (1) substantially in a plane with an upper boundary surface of the closing plate, said flange having a first end adjacent to an end of said closing plate;
   a substantially U-shaped connecting part (2, 3) including a first leg (2) connected to said sealing flange (1) and a second leg (3), said legs forming an opening facing toward said sealing flange, said second leg (3) being located at a larger distance from the closing plate than the first leg (2), the second leg (3) having a surface remote from the first leg (2) connected to the supporting flange (15); and
   a resilient lip (9) connected to the first leg (2) and engageable with an underside of the closing plate in a closed position of the closing plate and wherein said sealing flange (1) abuts against the closing plate (14).

9. A roof panel intended for closing an opening in a roof of a motor vehicle, comprising:
   a substantially flat transparent closing plate having a circumference;
   a supporting flange extending adjacent to the lower side of the closing plate and extending at least along a part of the circumference of the closing plate;
   a sealing section provided at least along a part of the circumference of the closing plate and connected to the supporting flange, said sealing section including:
   a connecting part for attachment of the sealing section to the supporting flange of the roof panel, said connecting part having an upwardly extending leg with an upper end;
   a buffer part connected to a side of the connecting part remote from the closing plate and being adapted to seal against the roof of the motor vehicle; and
   a sealing flange being at least substantially in line with said closing plate, said sealing flange having a first free end and a second end in contact with the closing plate;
   said sealing flange, near the second end, joining the leg of the connecting part and by virtue of this leg, is adapted to slide inwardly and outwardly into contact with the buffer part to adapt the sealing section to dimensional tolerances of the closing plate.

* * * * *